Sept. 4, 1934.  J. E. GILLESPIE  1,972,770
WHEEL
Filed May 24, 1933  2 Sheets-Sheet 1

Jayson E. Gillespie
INVENTOR
BY Victor J. Evans & Co.
ATTORNEY

Sept. 4, 1934.  J. E. GILLESPIE  1,972,770
WHEEL
Filed May 24, 1933  2 Sheets-Sheet 2

Jayson E. Gillespie
INVENTOR
BY Victor J. Evans & Co.
ATTORNEY

Patented Sept. 4, 1934

1,972,770

UNITED STATES PATENT OFFICE 1,972,770

WHEEL

Jayson E. Gillespie, Lincoln, Nebr.

Application May 24, 1933, Serial No. 672,721

2 Claims. (Cl. 152—11)

The object of this invention is to provide means whereby a vehicle wheel equipped with a pneumatic tire will be maintained in a proper riding condition, notwithstanding possible punctures in the tire.

The invention relates particularly to wheels of the disc type and seeks to utilize the body of the wheel as a reservoir for compressed air which is placed in communication automatically with the air tube of the tire in the event a tire is punctured.

A further object of the invention is to provide a tire of such construction that in the event of a puncture it will not immediately collapse but will be maintained in a more or less inflated condition so that the riding qualities of the wheel and the vehicle equipped therewith will not be appreciably impaired.

The invention is illustrated in the accompanying drawings and consists in certain novel features which will be hereinafter first fully described and then particularly defined in the appended claims.

Figure 1:
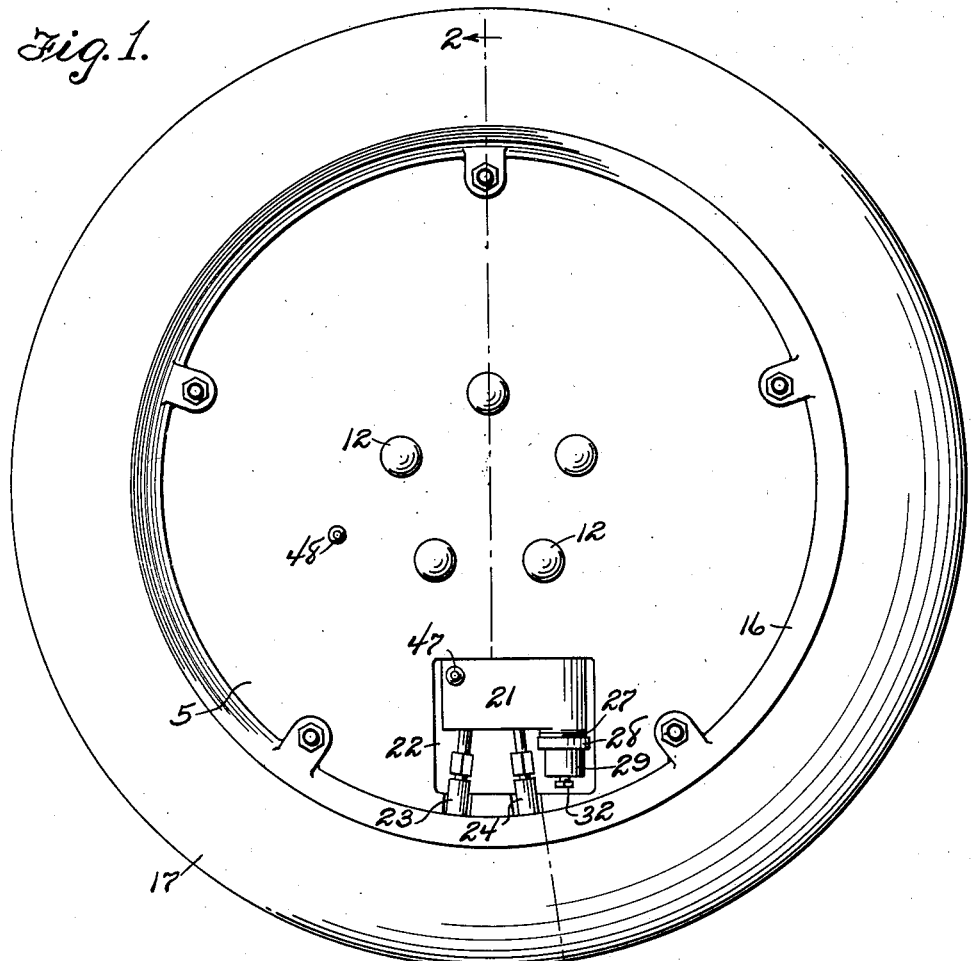
Figure 1 is a side elevation of a wheel embodying the invention.

In the drawings, the reference numeral 1 indicates an axle having an end disc or attaching head 2 equipped with stud bolts 3, these parts being of any approved design. The wheel embodying the present invention, includes two discs 4 and 5 which are of a general dished formation whereby when properly assembled they converge toward their peripheries as will be understood upon reference to Figure 2. The discs are connected at various points in their area by cross rods 6 so that they will be thoroughly reinforced and lighter discs may be used than would otherwise be possible. The inner disc 4 is provided with an inset portion or hub member 7 which is adapted to fit closely around the head 2 of the axle and is formed with openings through which the stud bolts 3 project. This inner disc is also provided with a hood 8 at its center which is adapted to fit around the axle nut 9, as clearly shown. Tubular connections 10 are formed with the discs so as to further reinforce and brace the structure and these tubes are so located as to align with the several stud bolts 3 and facilitate the application of the fastening nuts 11 thereto. The tubes are normally closed by removable plugs 12 so that the entrance of dirt and other foreign matter to the tubes and the nuts and stud bolts will be prevented. The inner disc 4 has formed thereon an annular felly member 13, spaced inwardly from its extreme edge, whereby a flange 14 is produced to furnish a side bearing for the tire. A rim member 15 is engaged with the felly member 13 and this rim member is formed with a retaining flange 16, between which and the flange 14, the tire is secured. The rim member 15 is removable so that when tire repairs are necessary they can be easily effected.

Figure 2:
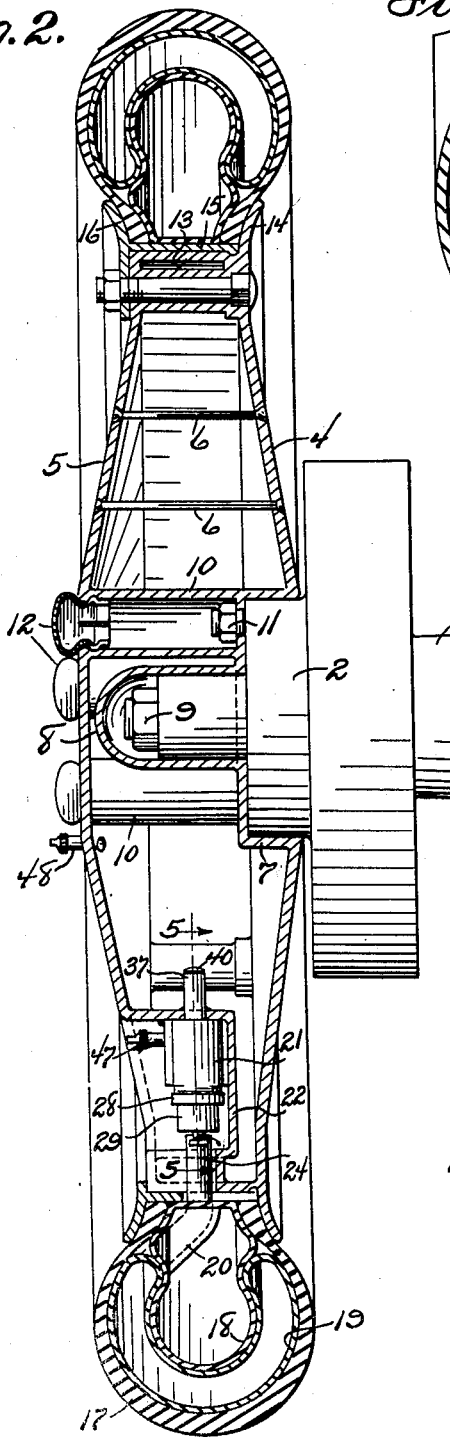
Figure 2 is a section on the line 2—2 of Figure 1 on an enlarged scale.
Figure 3:
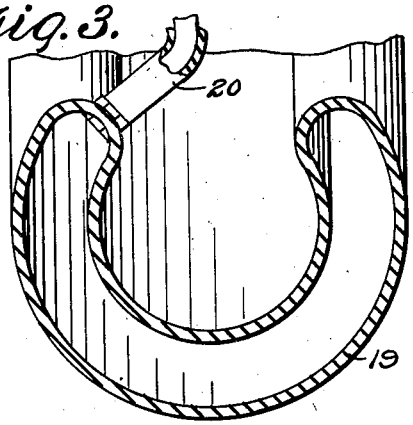
Figure 3 is an enlarged transverse section of the outer air tube of the tire.
Figure 4:
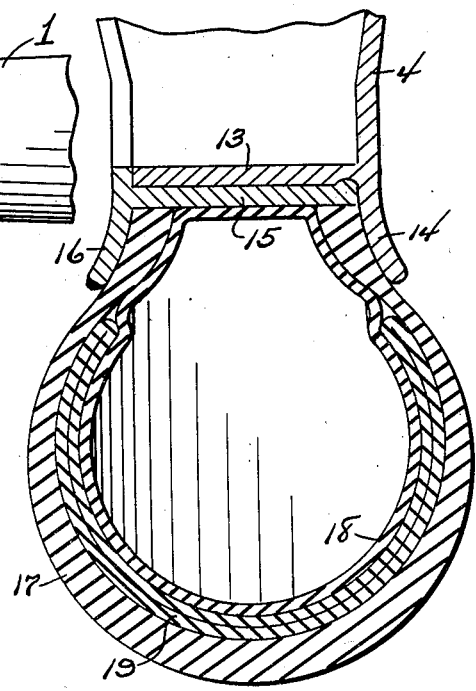
Figure 4 is a similar view of the tire showing the outer air tube collapsed while the inner tube is inflated.

The tire comprises an outer casing 17 which is of the same general construction now generally employed and fits at its edges against the rim member 15 and between the flanges 14 and 16, as clearly shown in Figures 2 and 4. This casing may be constructed of the usual fabric material or in any other approved manner. Encircling the rim and disposed within the tire casing are an inner air tube 18 and an outer air tube 19 which are constructed of rubber, as will be understood. The outer tube 19 is an endless bag having a semi-circular cross section so that when the tube is collapsed, the two plies or walls of the tube will fit closely together and within the inner circumference of the casing 17, as clearly shown in Figure 4. The inner tube 18 has a cross section corresponding to the cross sectional contour of the chamber defined by the rim 15, the edges of the casing 17 and the outer tube 19, as clearly shown in Figure 4, so that when the inner tube is inflated the casing will be supported in ridable form and the outer tube may be fully collapsed and accommodated between the casing and the inner tube. Normally both tubes are inflated, as shown in Figure 2, so that the outer casing will be held in fully distended form and the tubes will be mutually reinforced and support each other. Each tube is provided with an inlet or inflation valve which may be of any approved form and are extended through openings provided therefor in the rim as will be understood. The inflation valves are connected by flexible couplings, such as hose 20, properly reinforced, with the respective tubes and the couplings are so disposed that the valves controlling the flow to and from them will be disposed within an air chamber or valve chest 21 carried by the body of the wheel. As shown most clearly in Figure 2, the wheel is constructed with a recess or inset portion 22 on the outer disc whereby there is provided a chamber open at its outer side and the valve chest 21 is located in this chamber or recess and may be formed integral with the wheel disc. The inflation tubes 23 and 24 pass into the valve chest through the under-side of the same, as clearly shown in Figure 5, and pivotally disposed within the valve chest, above the ends of the tubes, is a rocking valve consisting of a plate 25 pivoted between its ends and having its ends so disposed that they may at times engage the end of the subjacent tube. A partition 26 is formed within the valve chest and at one end of the chest, on the underside of the same, is a boss 27 engaged by a nut 28 whereby the hood 29 will be secured to the boss in dependent relation. A flexible diaphragm 30 is clamped by and between the boss and the hood and an expansion spring 31 is disposed within the hood to bear against the under-side of the diaphragm so as to tend constantly to flex the diaphragm upwardly. A set screw 32 is mounted in the lower end of the hood 29 and engages with the spring 31 so as to regulate the tension of the spring. A partition 33 is arranged above the diaphragm 30 and this partition may be an extension of the bottom of the valve chest.

A guide 34 is formed on the partition 33 and a stem 35 rises from the diaphragm through said guide to move vertically within the smaller chamber, between the partition 26 and the end of the valve chest, this stem acting as a lifter rod in the operation of the device as will presently appear. A short tube 36 connects the valve chamber with the diaphragm chamber so that the air pressure in these two chambers will be equalized. Rising from the top of the valve chest and extending through the upper wall of the inset 22 is a nipple 37 which extends into the chamber of the wheel, as clearly shown in Figure 2. The nipple 37 has an extension 38 within the valve chest and a lateral port or passage 39 establishes communication between the nipple and the valve chamber of the valve chest. A valve 40 is arranged to seat in the upper end of the nipple 37 and hold the same normally closed, a guide 41 for the valve stem 42 being provided in the nipple, said valve extending through the bottom of the extension 38 in alignment with the lifter rod 35, whereby when said lifter rod moves upwardly the valve 40 will be unseated. An expansion spring 43 is disposed about the valve stem 42 between the guide 41 and an abutment 44 on the stem so as to cooperate with the air pressure in the wheel to normally hold the valve seated. To insure proper operation of the stem and the lifter, a disc 45 is provided on the lower end of the valve stem and an enlarged head 46 is provided on the upper end of the lifter. A test valve 47, of any approved form, is provided in the outer side of the valve chest 21 so that the pressure in the chest may be tested at any time, and an inflation valve 48 is provided at any convenient point in the outer disc of the wheel so that compressed air may be supplied to the interior of the wheel, it being understood and being so shown in the drawings that the felly member 13 and the sleeves or tubes 10 are formed integrally or otherwise intimately united with the discs so that leakage of air from the chamber provided by the body of the wheel will be prevented.

Figure 5:
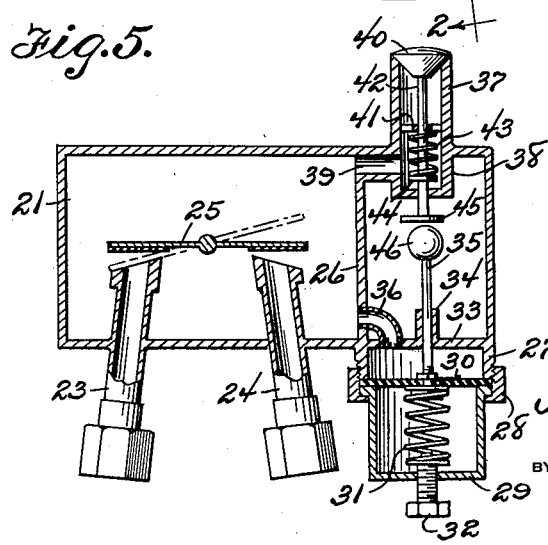
Figure 5 is an enlarged detail section on the line 5—5 of Figure 2.

It is thought the operation and advantages of the device will be readily understood from the foregoing description, taken in connection with the accompanying drawings. Normally the two tubes 18 and 19 are inflated so that the tire casing will be held distended to the desired degree, as shown in Figure 2. The air pressure within the valve chest will maintain the tubes inflated and will also hold the diaphragm 30 in its flat lower condition, as shown in Figure 5, the valve 25 being normally in the position shown in full lines in said figure. Should the tire pick up a nail or other sharp pointed element so that the outer tube 19 will be punctured, the pressure within the inner tube will cause the latter to more fully expand and maintain the inflated condition of the casing, as shown in Figure 4. When the tube is punctured the air escaping therefrom will create a suction through the corresponding tube 23 or 24, as the case may be, and the valve 25 will be thereby rocked so that one end thereof will rest upon the tube through which the suction is created, as shown by the dotted line in Figure 5, thereby cutting off the escape of the air. Before the escape of the air, however, is entirely cut off the pressure in the valve chest will have been reduced sufficiently to permit the spring 31 to expand and flex the diaphragm 30 upwardly so that the valve 40 will be unseated and compressed air from the air chamber of the wheel may flow through the nipple 37 into the valve chest to more fully inflate the inner tube which will collapse the punctured outer tube, as shown in Figure 4, and the vehicle may be operated in this manner until repairs can be effected.

The air chamber of the wheel is, of course, supplied with compressed air to its capacity at some supply station before starting upon a trip and the operator of the vehicle may then take his trip without fear of being seriously incommoded through tire trouble. The device is very simple and compact and will not add materially to the weight of the wheel while it is entirely automatic in operation.

Having described the invention, I claim:

1. A vehicle wheel comprising a hollow body, a tire mounted upon the periphery of the body and including an outer casing and inner and outer inflatable tubes within the casing, a valve chest on the body and having communication at one side with the hollow of the body and at the other side with the respective tubes of the tire, an air pressure operated valve controlling communication between the chest and the hollow of said body, inflation tubes between the said inflatable tubes and said chest to constitute the communication therebetween, and a single valve pivoted for double action to open one and close the other of the inflation tubes, whereby upon deflation of either of the inflatable tubes, communication will be had between said chest and the other inflatable tube.

2. A chambered vehicle wheel of the disk type having a recess in its outer side, a tire mounted on the periphery of the wheel and having several inner tubes, a valve chest in said recess and having a valve chamber and a diaphragm chamber, pressure equalizing means in the valve chamber and diaphragm chamber, a tube leading from the valve chamber to the chest, a nipple leading from the valve chamber to the chamber of the wheel, a valve normally closing said nipple and having a stem, inflation tubes leading from the inner tubes to said valve chest, a single valve pivoted for double action to open one and close the other inflation tube, whereby upon deflation of either of the inflatable tubes, communication will be had between said chest and the other inflatable tube, and a flexible diaphragm in the diaphragm chamber and having a lifter for actuating the valve stem whereby on deflation of one inner tube the valve in said nipple will be open for communication between the valve chest and the chamber of the wheel.

JAYSON E. GILLESPIE.